United States Patent
Polat et al.

(10) Patent No.: US 8,677,112 B2
(45) Date of Patent: Mar. 18, 2014

(54) AUTOMATIC NOTIFICATION BASED ON GENERIC STORAGE FRAMEWORK

(75) Inventors: Ebru Polat, Cagnes sur Mer (FR); Emmanuel Turci, Antibes (FR)

(73) Assignee: SAP AG, Walldorf (DE)

( * ) Notice: Subject to any disclaimer, the term of this patent is extended or adjusted under 35 U.S.C. 154(b) by 206 days.

(21) Appl. No.: 13/108,603

(22) Filed: May 16, 2011

(65) Prior Publication Data

US 2012/0278607 A1   Nov. 1, 2012

Related U.S. Application Data

(60) Provisional application No. 61/480,570, filed on Apr. 29, 2011.

(51) Int. Cl.
*G06F 1/24* (2006.01)
*G06F 9/24* (2006.01)

(52) U.S. Cl.
USPC .................................. 713/100; 713/1; 713/2

(58) Field of Classification Search
USPC .................................. 713/1, 2, 100
See application file for complete search history.

(56) References Cited

U.S. PATENT DOCUMENTS

| | | | |
|---|---|---|---|
| 8,015,049 B1* | 9/2011 | Tam et al. | 705/7.18 |
| 8,140,683 B2* | 3/2012 | French et al. | 709/227 |
| 2003/0148775 A1* | 8/2003 | Spriestersbach et al. | 455/456 |
| 2006/0212621 A1* | 9/2006 | Ash et al. | 710/62 |
| 2008/0167770 A1* | 7/2008 | Macdonald et al. | 701/24 |
| 2012/0058782 A1* | 3/2012 | Li | 455/456.2 |
| 2012/0269116 A1* | 10/2012 | Xing et al. | 370/328 |
| 2012/0271913 A1* | 10/2012 | Tallgren et al. | 709/217 |

* cited by examiner

*Primary Examiner* — Vincent Tran
(74) *Attorney, Agent, or Firm* — Brake Hughes Bellermann LLP

(57) ABSTRACT

According to one general aspect, a method may include associating a configuration value with at least one machine executable activity. The method may also include detecting that the configuration value has changed. In various embodiments, the method may include automatically determining which, if any, machine executable activities are directly dependent upon the changed configuration value. The method may further include automatically executing, by a processor, at least a portion of the machine executable activities that are directly dependent upon the changed configuration value.

20 Claims, 7 Drawing Sheets

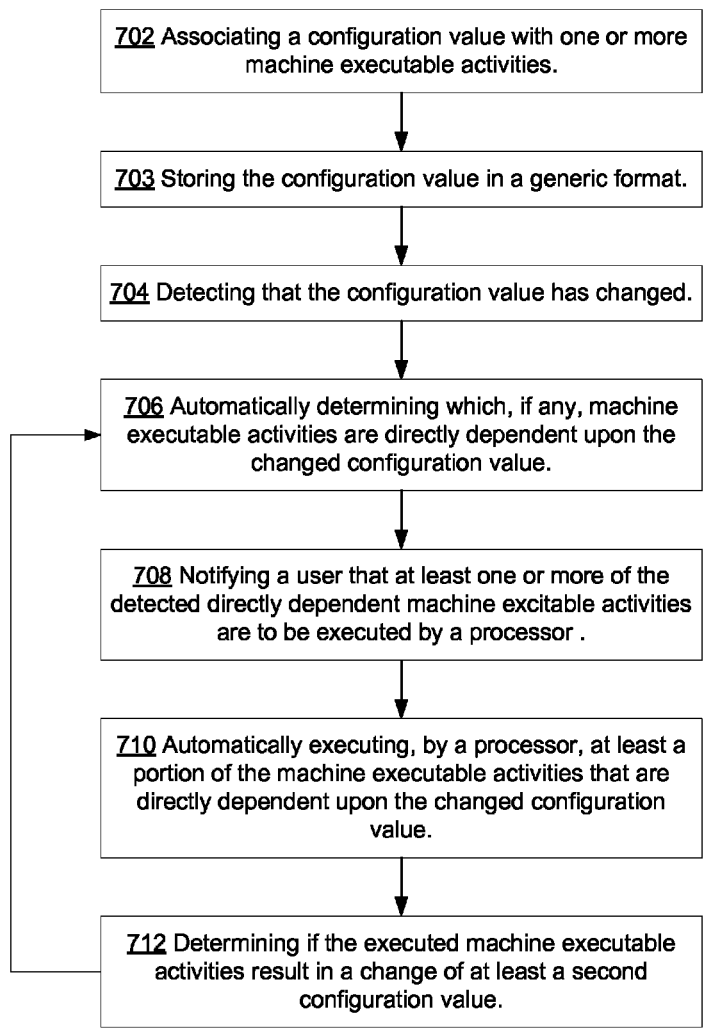

AUTOMATIC NOTIFICATION BASED ON GENERIC STORAGE FRAMEWORK

CROSS-REFERENCE TO RELATED APPLICATION

This application claims the benefit of U.S. Provisional Application Ser. No. 61/480,570, entitled "AUTOMATIC NOTIFICATION BASED ON GENERIC STORAGE FRAMEWORK" filed on Apr. 29, 2011. The subject matter of this earlier filed application is hereby incorporated by reference.

TECHNICAL FIELD

This description relates to the storing and processing of information.

BACKGROUND

Traditionally, computer executable programs or applications stored and retrieved data using a format or scheme tailored to suit the needs of the particular program. However, when operating a plurality of programs substantially simultaneously or in concert, the plurality of different storage formats and schemes may prove difficult.

Frequently, the sharing of data between applications was accomplished via format translators or "wrapper scripts". In the case of format translators, a program or portion of a program was responsible for reading data in an alien or foreign format and translating the data into a format the reading program could interpret. Likewise, "wrapper" scripts or programs included third-party programs that translated one data storage format, generated by a first program, into another format that a second program could read. Occasionally, such data format translation was also applied to the act of data storage.

In a heterogeneous computing environment, data storage complexity level can be different for each application. In the case in which the data stored is configuration data, some configurations might include security relevant data such as user and password information for several systems. In addition, the structure of some configurations might change in time (e.g., as the application is upgraded, etc.). Hence the data formats cannot be always fixed and fully specified in advance at for translation applications.

In addition, for complex systems involving a large amount of data, reports or other data manipulation activities are often performed on the stored data. Frequently, these data manipulation activities are often dependent upon configuration data or underlying data values (e.g., user and password information, etc.). In such a system when the underlying configuration data is changed the results of the activities may become invalid or the activity may no longer executable. If the system is not trivially simple, a user, system, or program may not be aware that an underlying data value has been updated or changed.

SUMMARY

A system and/or method for storing and processing information, substantially as shown in and/or described in connection with at least one of the figures, as set forth more completely in the claims.

According to one general aspect, a method may include associating a configuration value with at least one machine executable activity. The method may also include detecting that the configuration value has changed. In various embodiments, the method may include automatically determining which, if any, machine executable activities are directly dependent upon the changed configuration value. The method may further include automatically executing, by a processor, at least a portion of the machine executable activities that are directly dependent upon the changed configuration value.

According to another general aspect, an apparatus may include a memory, a processor and a notification system. In various embodiments, the memory may be configured to store at least one configuration value in a generic format. In some embodiments, the processor may be configured to execute at least one machine executable activity. In some embodiments, the notification system may be configured to: associate a configuration value with at least one machine executable activity; detect that the configuration value has changed; automatically determine which, if any, machine executable activities are directly dependent upon the changed configuration value; and automatically cause the execution, by the processor, of at least a portion of the machine executable activities that are directly dependent upon the changed configuration value.

According to another general aspect, a computer program product for storing and processing information may include executable code that, when executed, is configured to cause a data processing apparatus to associate a configuration value with at least one machine executable activity. The code may also cause the apparatus to detect that the configuration value has changed. The code may also cause the apparatus to automatically determine which, if any, machine executable activities are directly dependent upon the changed configuration value. The code may also cause the apparatus to automatically execute, by a processor, at least a portion of the machine executable activities that are directly dependent upon the changed configuration value. In various embodiments, the computer program product being tangibly embodied on a computer-readable medium.

The details of one or more implementations are set forth in the accompanying drawings and the description below. Other features will be apparent from the description and drawings, and from the claims.

BRIEF DESCRIPTION OF THE DRAWINGS

FIG. 7 is a flowchart of an example embodiment of a technique in accordance with the disclosed subject matter.

Like reference symbols in the various drawings indicate like elements.

DETAILED DESCRIPTION

Figure 1:
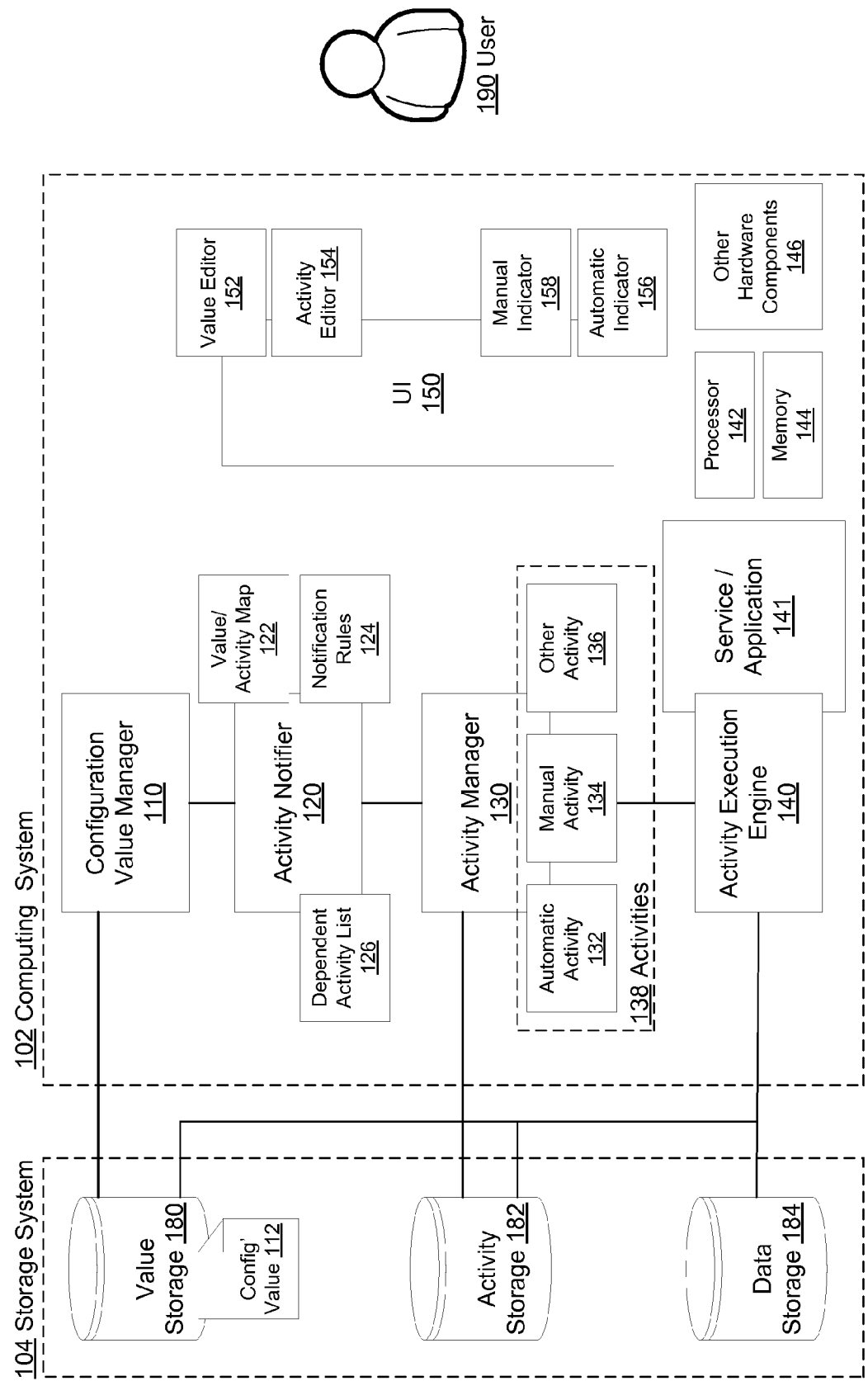
FIG. 1 is a block diagram of an example embodiment of a system in accordance with the disclosed subject matter.

FIG. 1 is a block diagram of an example embodiment of a system 100 in accordance with the disclosed subject matter. In the illustrated embodiment, the system 100 may include a computing system 102, operated or used by a user 190, and a storage system 104. In various embodiments, the disclosed subject matter may be used or include at least one computing device (e.g., administrative system 102) and the storage system 104 may include one or more storage systems. In the illustrated embodiment, the systems 102 and 104 will be described as single systems for purposed of simplified illustration.

In some embodiments, the system 102 may include or provide a service or application 141. In various embodiments, the service 141 may process, read, and write various pieces of data or information. Such data may be stored remotely or locally in a storage system 104 (which may include a plurality of storage systems) in a data storage 184.

In various embodiments, the system 102 may provide a service 141, such as, for example, Supplier Relationship Management (SRM), Product Lifecycle Management (PLM), Supply Chain Management (SCM), Customer relationship management (CRM), Enterprise resource planning (ERP), etc. It is understood that the above are merely a few illustrative examples to which the disclosed subject matter is not limited.

In various embodiments, the service 141 may include machine executable instructions which are executed by a processor 142. In some embodiments, the service may utilize or be stored within a memory 144. In various embodiments, the memory 144 may be employed to store temporary values or data during the execution of the service 141. In some embodiments, the memory may include volatile memory, non-volatile memory or a combination thereof. In addition the system 102 may include one or more other hardware components (e.g., a network interface, a display or monitor, etc.) that may or may not be utilized to aid the execution of the service 141.

In various embodiments, the service 141 may produce or provide a user interface (UI) 150 configured to allow a user 190 to control or interact with the service 141. In the case of embodiments in which the system 100 includes a distribute network of devices, the UI 150 may include a web interface generated by the service 141 and displayed on a second computing device (not shown). However, in the illustrated embodiment, the UI 150 is displayed via the computing system 102 to the user 190.

In some embodiments, the service 141 may include or make use of one or more machine executable activities 138 or, more commonly referred to simply as activities 138. In this context, a machine executable activity 138 may include a series of machine executable (e.g., via processor 142) instructions which manipulate the data associated with the service 141 or make use of functions (e.g., create a customer data object, change a customer's address and contact information, etc.) provided by the service 141 in an automated fashion. Frequently, activities 138 may be executed in a non-interactive manner that required little or no interaction with e the user 190. In various embodiments, activities 138 may also be referred to as macros or scripts; however, it is understood that not all macros or scripts, in the broadest use of the terms, may be considered activities 138.

In various embodiments, the activities 138 may use, employ, or depend upon one of more configuration data or values 112. In this context, a configuration value 112 may include a price of data which controls or changes the way an activity 138, service 141, or the system 102 in general operates or executes instructions. In some embodiments, the configuration value 112 may include authorization information (e.g., username and password), location information (e.g., the network address of the data storage 184, etc.), UI 150 information (e.g., company logo, title information, etc.). It is understood that the above are merely a few illustrative examples to which the disclosed subject matter is not limited.

In some embodiments, the configuration values 112 may each be associated or include a scope or range of conditions or contexts in which the configuration value 112 is valid, applies or is associated. For example, in various embodiments, a number of computing devices may operate within a system (such as that of system 200 of FIG. 2). In such an embodiment, a configuration value 112 may be limited in scope to one system or group of systems. In another embodiment, the configuration value 112 may include a scope that is limited to a certain service 141 or type of service 141 (e.g., CRM, ERP, etc.). As such, in various embodiments, configuration values 112 of the same or similar names or identifiers may co-exist wherein those configuration values 112 are separated by differing scopes. In yet another embodiment, the scope of the configuration value 141 may be based upon the user 190 executing, creating or receiving the results of the activity 138 or service 141.

In one specific embodiment, a system may include three computing systems (e.g., three computing systems 106 of FIG. 2), specifically a development computing system, a testing computing system, and a production computing system. In such an embodiment, a configuration value 112 may include a scope limited to the development computing system. In such an embodiment, the development computing system would see or experience any changes in the configuration value 112, but the testing computing system and production computing system would not. In one such embodiment, a developer or user 190 may make changes in the configuration value 112 without influencing, altering, or breaking the way in which the testing computing system and production computing system function or execute their respective services 141 and activities 138. It is understood that the above is merely one illustrative example to which the disclosed subject matter is not limited.

Returning to the more simplified single computing system 102 illustration of FIG. 1, in various embodiments, the UI 150 may include an activity editor 154 configured to allow or facilitate the creation, changing, or deletion of one or more activities 138. In various embodiments, the activities may include one or more activity types or categories. In the illustrated embodiment, the activities 138 may be categorized as automatic activities 132, manual activities 134, and other activities 136.

In one embodiment, an automatic activity 132 may include an activity that may be executed automatically by a computing device (e.g., computing device 102) without interaction or intervention by the user 190. In some embodiments, an automatic activity 132 may be referred to as a background or non-interactive activity. Examples of such automatic activities 132 may include, but are not limited to: weekly data report generation, data culling, quarterly or annual financial reporting, etc. It is understood that the above are merely a few illustrative examples to which the disclosed subject matter is not limited.

In one embodiment, a manual activity 134 may include an activity that may be executed by a computing device (e.g., computing device 102) due to the request or intervention of the user 190. In various embodiments, once the manual activity 134 is initiated the user 190 may not need to interact with the manual activity 134 again. In another embodiment, the manual activity 134 may require user 190 intervention at or during various stages of the execution of instructions. For example, the manual activity 134 may cause the UI 150 to prompt the user 190 for pieces of information or data (e.g., file locations, authorization credentials, etc.). Examples of such manual activities 134 may include, but are not limited to: the creation of a user account and authentication credentials, a specialized data mining report, etc. It is understood that the above are merely a few illustrative examples to which the disclosed subject matter is not limited.

In another embodiment, another activity 136 may include an activity that does not fit into either the automatic activity 132 or manual activity 134 categories. Examples of such other activities 136 may include, but are not limited to: custom activities. In such an embodiment, custom activities may include activities in which a user interaction is part of the activity. In some embodiments, this may include entering one or more values. In such an embodiment, a custom user interface may be associated with or included by the activity to facilitate the entering of such values as are required by the custom activity. It is understood that a "custom activity" is merely one illustrative example of another activity 136 to which the disclosed subject matter is not limited.

In a specific example, a custom activity 136 may include the creation of a project (e.g., a software development project, a business process project, etc.). In such an embodiment, the custom activity may require a user to enter the project's name and any other desired values. In another example, a custom activity 136 may include the creation or modification of a user account. In such an embodiment, the custom activity may require the administrator (e.g., a user with special privileges, such as creating other user accounts) to enter at some point during the execution of the activity the new user's user name and password. It is understood that the above are merely a few illustrative examples to which the disclosed subject matter is not limited.

In various embodiments, the activities 138 may be stored by an activity storage 182. In some embodiments, this activity storage 182 may co-exist with one or more of the other portions of the storage system 104. In some embodiments, the activity storage 182 may be distributed, local, remote, or a combination thereof.

In one embodiment, the activities 138 may be managed by an activity manager 130. In such an embodiment, the activity manager 130 may be configured to manage the execution, storage, and retrieval of various activities 138 from one or more systems (e.g., storage system 104, computing device 102, etc.). In some embodiments, the activity manager 130 may be configured to submit or schedule the execution of an activity by a system (e.g., computing device 102) or an activity execution engine 140.

In various embodiments, the activity execution engine 140 may be configured to orchestrate or control the execution of one or more activities 138. In some embodiments, the activity execution engine 140 may be configured to interpret or execute the activity 138. In such an embodiment, the activity 138 may be executed indirectly by the processor 142 which is directly executing the activity execution engine 140. In another embodiment, the activity 138 may execute directly by the processor 142. In various embodiments, the activity execution engine 140 or activity 138 may access, change, or process data stored within the data storage 184 (e.g., inventory data, business data, customer data, financial data, etc.). In some embodiments, the activity 138 may change a configuration value 112.

In various embodiments, the UI 150 may include a value editor 152 configured to allow or facilitate the creation, changing, or deletion of one or more configuration values 112. The new configuration value 112 may be received or processed by a configuration value manager 110. The configuration value manager 110 may, in turn, store the configuration value 112 within or to a value storage 180. In various embodiments, the value storage 180 may be distributed.

Figure 2:
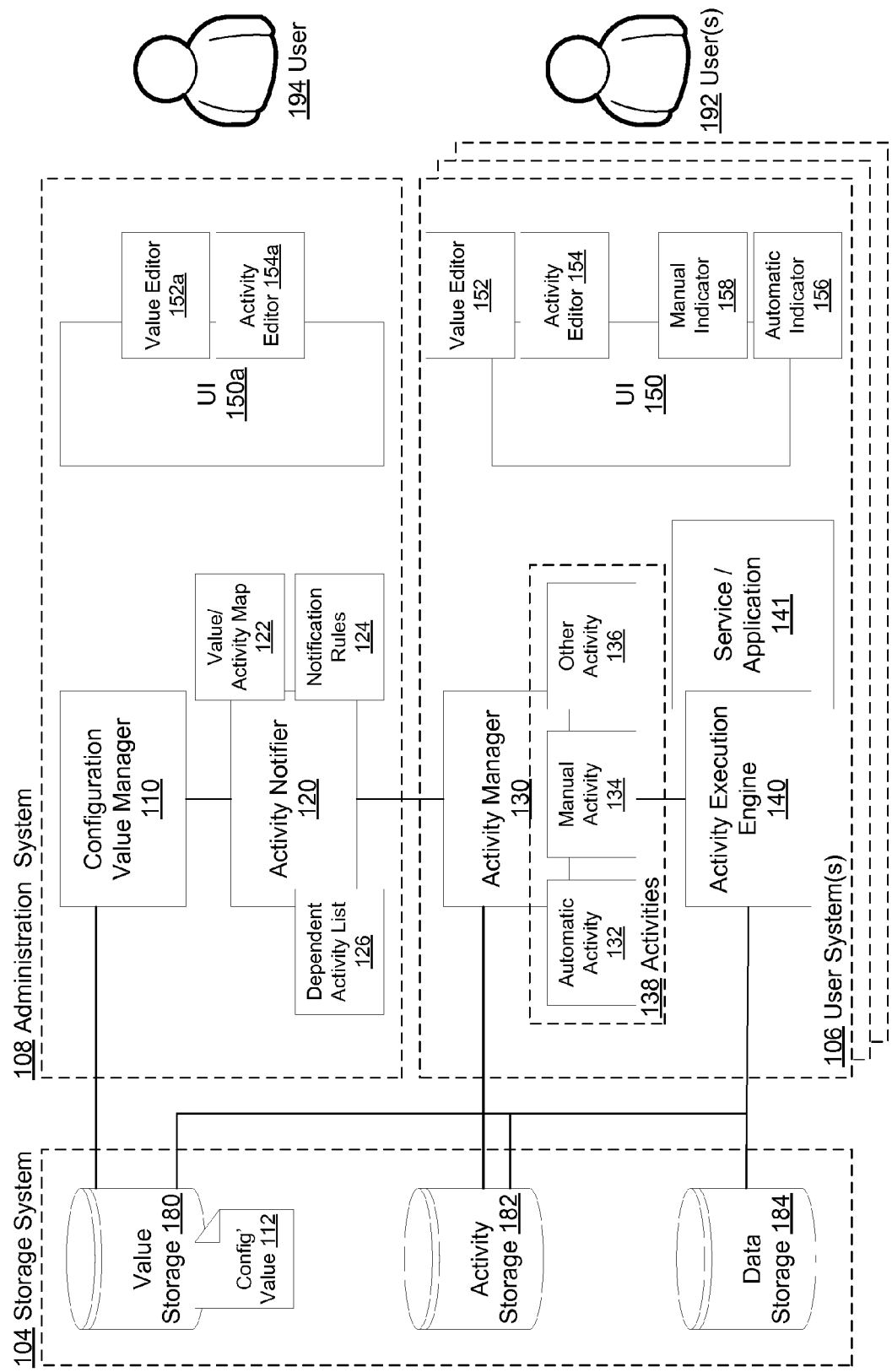
FIG. 2 is a block diagram of an example embodiment of a system in accordance with the disclosed subject matter.

In various embodiments, the configuration value 112 may be stored in a generic format that is accessible by a plurality of different services 141 or applications 141 (shown in FIG. 2). In such an embodiment, these plurality of different services 141 may include multiple instances of a service 141 but also multiple types of services 141 (e.g., CRM, ERP, etc.) or versions of services 141 (e.g., version 1.0, version 2.3, etc.). As described below in reference to FIG. 6, in some embodiments, the mechanisms, functions or objects which read or store the configuration values 112 may implement or inherent methods or functions to read and write data in the generic format. In various embodiments, the generic configuration data 112 may be stored in an Extensible Markup Language (XML) format; although, it is understood that the above is merely one illustrative example to which the disclosed subject matter is not limited.

In various embodiments, the system 102 may include an activity notifier 120 configured to detect when a configuration value 112 changes. In some embodiments, the configuration value manager 110 may inform the activity notifier 120 when this occurs. In another embodiment, the activity notifier 120 may monitor the status of the configuration values 112.

In addition, the activity notifier 120 may be configured to monitor activities 138 and determine what configuration values 112 are utilized by those activities 138. In such an embodiment, it may be said that these activities 138 are dependent upon their respective configuration values 112. Said another way, the activities 138 and their respective configuration values 112 may be said to be in an observer/observed relationship. In such an embodiment, the activity 138 may be the observer and the respective configuration value(s) 112 may be the observed.

In one embodiment, the activity notifier 120 may be configured to maintain a list or mapping 122 of associations between activities 138 and their respective configuration values. In such an embodiment, once a change in a configuration value 112 is detected, the activity notifier 120 may be configured to determine which activities 138 are dependent or observers of that changed configuration value 112. In various embodiments, these dependent activities may be stored or represented within a dependent activity list 126. In some embodiments (illustrated by FIG. 4), the activity notifier 120 may be configured to only determine which activities are directly dependent upon the changed configuration value 112.

In another embodiment, activities 138 may change configuration values 112. In turn these newly changed configuration values 112 may be observed by additional activities 138. These activities 138 that are subsequently affected indirectly by the original changed value 112 (via the activities 138 which are directly dependent of the original changed value 112) may be said to be indirectly dependent on the original changed value 112. In some embodiments, the activity notifier 120 may be configured to determine which activities are indirectly dependent upon the original changed value 112. In one embodiment, this determination of indirectly dependent activities 138 may be part of an initial dependency determination. In another embodiment, (e.g., that illustrated by FIG. 4), the activity notifier 120 may be configured to recursively determine dependent activities 138 as the effects of the originally changed configuration value 112 propagates throughout the various activities 138. It is understood that the above are merely a few illustrative examples to which the disclosed subject matter is not limited.

In one embodiment, the activity notifier 120 may be configured to automatically cause the dependent activities 138 to be executed by the activity execution engine 140. In such an embodiment, the activity notifier 120 may be configured to notify the activity manager 130 that the dependent activities 138 have been affected by the change in the configuration value 112. In one embodiment, this notification may include the dependent activities list 126. The activity manager 130 may then schedule or cause the activity execution engine 140 to execute the dependent activities 138.

Returning to the activity notifier 120, in various embodiments, the activity notifier 120 may be configured to maintain or utilize one or more notification rules 124 to filter the activities associated 138 with the changed configuration value 112. For example, in one embodiment, the notification rules 124 may dictate that only configuration values 112 associated with a given computing system (e.g., a development system, etc.) or more generally a particular scope may be considered when generating the dependent activity list 126. Likewise, just as configuration values 112 may be associated with various scopes, activities 138 may include or be associated with similar scopes. The notification rules may take such scopes or characteristics (e.g., executing computing system, service type, geographical location, etc.) into consideration when filtering the activities 138 to determine the list of dependent activities 126.

While FIG. 1, for the sake of simplicity, illustrates only one computing system 102 It is understood that systems (e.g., system 200 of FIG. 2) comprising multiple computing systems 102 is within the scope of the disclosed subject matter. As a specific example embodiment illustrating filtering by the computing system, in one embodiment, a notification rule 124 may dictate that only activities 138 executed by a "development computing system" may be automatically executed or considered dependent upon a configuration value 112 change. In such an embodiment, activities executing on or by a production computing system may not be affected by the change in an associated configuration value 112. The dependent activity list 126 may not include activities executed by the production computing system. Therefore, the activity manager 130 may not schedule such activities 138 to be executed. Whereas, activities 138 executed by a development system may be included in the dependent activity list 126 and the activity manager 130 may schedule such activities 138 to be executed. In such an embodiment, a developer may make a test configuration changes on their computing system while not affecting the stability of a production computing system.

In various embodiments, other filtering criteria may be included within the notification rules 124. For example, the notification rules may include criteria such as, but not limited to: executing computing system, service type, geographical location, type of configuration value 112, percentage change in configuration value, time of scheduled activity execution, type of change in the configuration value, etc. It is understood that the above are merely a few illustrative examples to which the disclosed subject matter is not limited.

In some embodiments, the activity manager 130 may be configured to notify or indicate to a user 190 that one or more activities 138 are dependent upon a changed configuration value 112. In such an embodiment, the activity manager 130 may provide or cause the UI 150 to display an indicator (e.g., automatic activity indicator 156, manual activity indicator 158, etc.) to the user 190.

In the illustrated embodiment, for the case of dependent automatic activities 132, the activity manager 130 may be configured to automatically execute the automatic activities 132. In one embodiment, this may occur without substantial user 190 interaction. In another embodiment, the activity manager 130 may be configured to display or cause the UI 150 to display a prompt (e.g., an automatic activity indicator 156) to the user 190 notifying the user 190 that the automatic activities 132 are being or scheduled to be executed. In various embodiments, this may occur in an asynchronous or non-blocking mode, such that the user 190 and other tasks performed by the service 141 are not blocked or disrupted.

In a less preferred embodiment, the activity manager 130 may be configured to display or cause the UI 150 to display a prompt (e.g., an automatic activity indicator 156) to the user 190 requesting permission to execute the dependent automatic activities 132. In some embodiments, the automatic activity indicator 156 may allow a user 190 to decline or prevent the execution of some or all of the dependent automatic activities 132. It is understood that the above are merely a few illustrative examples to which the disclosed subject matter is not limited.

In the illustrated embodiment, for the case of dependent manual activities 134, the activity manager 130 may be configured to not automatically execute the manual activities 134. In another embodiment, the activity manager 130 may be configured to display or cause the UI 150 to display an indicator (e.g., a manual activity indicator 158) to the user 190 notifying the user 190 that the dependent manual activities 132 are rely or are dependent upon a configuration value 112 that has changed. In one embodiment, this manual activity indicator 158 may include changing the displayed color that the UI 150 displays the manual activity 134 (e.g., in a list of activities) or displaying an icon next to the display of the manual activity 134.

In a less preferred embodiment, the activity manager 130 may be configured to display or cause the UI 150 to display a prompt (e.g., an automatic activity indicator 158) to the user 190 requesting permission to execute the dependent manual activities 134. In some embodiments, the manual activity indicator 158 may allow a user 190 to decline or prevent the execution of some or all of the dependent manual activities 132. It is understood that the above are merely a few illustrative examples to which the disclosed subject matter is not limited.

In various embodiments, a similar technique for user 190 interaction may be employed for the other activities 136. In some embodiments, the level of user 190 interaction in regards to dependent activities may be configurable and user changeable.

In various embodiments, the notification process and its results may be logged. In some embodiments, the several types of logs can be created. In one embodiment, a log or log entry may be created before starting the notification process, add a log entry that corresponds to the configuration value 12 being changed. In one embodiment, such a log entry may trigger the notification process performed by activity notifier 120. In some embodiments, the log entry may include the details about the list of activities 138 to be notified. In another embodiment, before the individual notification of each activity 138, a log entry may be added into the corresponding activity 138 that will be notified. In yet another embodiment, after the individual notification of each activity 138, as the results occur (e.g., an error, a change in another configuration value 112, etc.) and based upon the result, a log entry may be added into an indirectly dependent activity 138 that corresponds to the new configuration value 112 being changed and triggers notification process, as described above. It is understood that the above are merely a few illustrative examples to which the disclosed subject matter is not limited.

As described above, the execution of the dependent activities 138 may occur asynchronously or in a non-blocking fashion. In one such an embodiment, during the notification process of dependent activities 138, the user 190 may or may not be able to edit those impacted dependent activities 138. In some embodiments, the activity indicators 156 and 158 may facilitate a user 190 to open and edit a depend activity 138, prior to execution. In such an embodiment, the dependency between the changed configuration value 112 and the edited activity 138 may be re-evaluated. In another embodiment, the dependent activities 138 may be locked, or rendered un-editable during the notification process.

In some embodiments, only activities 138 that employ or make use of the generic storage mechanism described above may make use of the notification process. However, in another embodiment, activities 138 that employ or make use of the generic storage mechanism described above may have limited access or use of the notification process. For example, if an activity 138 does not inherit or implement the methods or functions related to the generic storage mechanism (e.g., the interface of FIG. 6), the activity notifier 120 may not be able to add or create the proper configuration value 112 to activity 138 associations for the Value/Activity Map 122 until the non-compliant activity 138 is compiled, processed, or instantiated (depending upon the embodiment). In such an embodiment, once the non-compliant activity 138 has been properly processed and its dependencies or observer/observed relationships have been determined by the activity notifier 120, notification of the non-compliant activity 138 may not occur. In some embodiments, such a non-compliant activity 138 may be included in the other activities 136.

FIG. 2 is a block diagram of an example embodiment of a system 200 in accordance with the disclosed subject matter. In various embodiments, the system 200 may comprise a storage system 104. Again, as described above, in various embodiments, the storage system 104 may include a plurality of storage sub-systems (not explicitly shown) which may be distributed, remote or local to the one or more of the systems 106 and/or 108, or the storage system 104 may include a combination thereof. In various embodiments, the system 200 may also include an administrative system 108 and one or more user systems 104. In such an embodiment, the storage system 104, user systems 106, and administrative system 108 may all each include a processor, memory and other various hardware components as described above in reference to FIG. 1, which are not explicitly illustrated in FIG. 2 for pedagogical reasons.

As described above, in various embodiments, the generic storage and notification system or process may be employed or included in a distributed and/or heterogeneous system. System 200 illustrates such a system with a plurality of user computing systems 106. In such an embodiment, the user computing systems or just "user systems 106" may include a variety of different services or applications 141. For example, a first user system 106 may include a CRM service 141, a second user system 106 may include an ERP service 141, and a third user system 106 may include a SRM service 141, and so forth. In another example, the plurality of user systems 106 may include a first user system 106 executing a first instance of a CRM service 141, a second user system 106 executing a second instance of a CRM service 141, and a third user system 106 executing a third instance of a CRM service 141, such as the development, testing and production services as described above. It is understood that the above are merely a few illustrative examples to which the disclosed subject matter is not limited.

Further, in various embodiments, the user systems 106 may include server-style computing devices or physical computing devices dedicated to running one or more such services 141, to serve the needs of programs running on or users 192 employing other computer devices via a network. In some embodiments, the plurality of user systems 106 may include a number of various computing devices types (e.g., servers, desktop, laptops, tablets, smartphones, etc.). It is understood that the above are merely a few illustrative examples to which the disclosed subject matter is not limited.

In the illustrated embodiment, the system 200 may include an administrative computing system 108 configured to administer or regulate the system 200. Such a system 108 may be controlled by an administrator, super-user, or more generally a user 194. In various embodiments, the administrative system 108 may be also include one of the user systems 106 (e.g., computing system 102 of FIG. 1). In some embodiments, a number of administrative systems 108 may exist within the system 200.

In the illustrated embodiment, the administrative system may include the configuration value manager 110 and the activity notifier 120. In such an embodiment, the configuration value manager 110 may be configured to monitor changes in configuration values 112 that are made from the devices across the system 200 (e.g., the user systems 106). Likewise, the activity notifier 120 may be configured to notify various devices across the system 200 or more specifically notify activities distributed throughout the system 200 which are dependent upon the changes in configuration values 112.

As described above, the activity notifier 120 may be configured to filter the dependent activities list 126 based upon one or more notification rules 124. As described above, the notification rules 124 may filter the impact of the changed configuration value 112 based upon various characteristics or factors related to the plurality of user systems 106. Such factors, as described above, may include: the scope of the configuration value 112, the identity of the user 192 using the user system 104, the name or identifier of the user system 104, the type of service 141 executed by the user system 104, etc. It is understood that the above are merely a few illustrative examples to which the disclosed subject matter is not limited.

Figure 3:
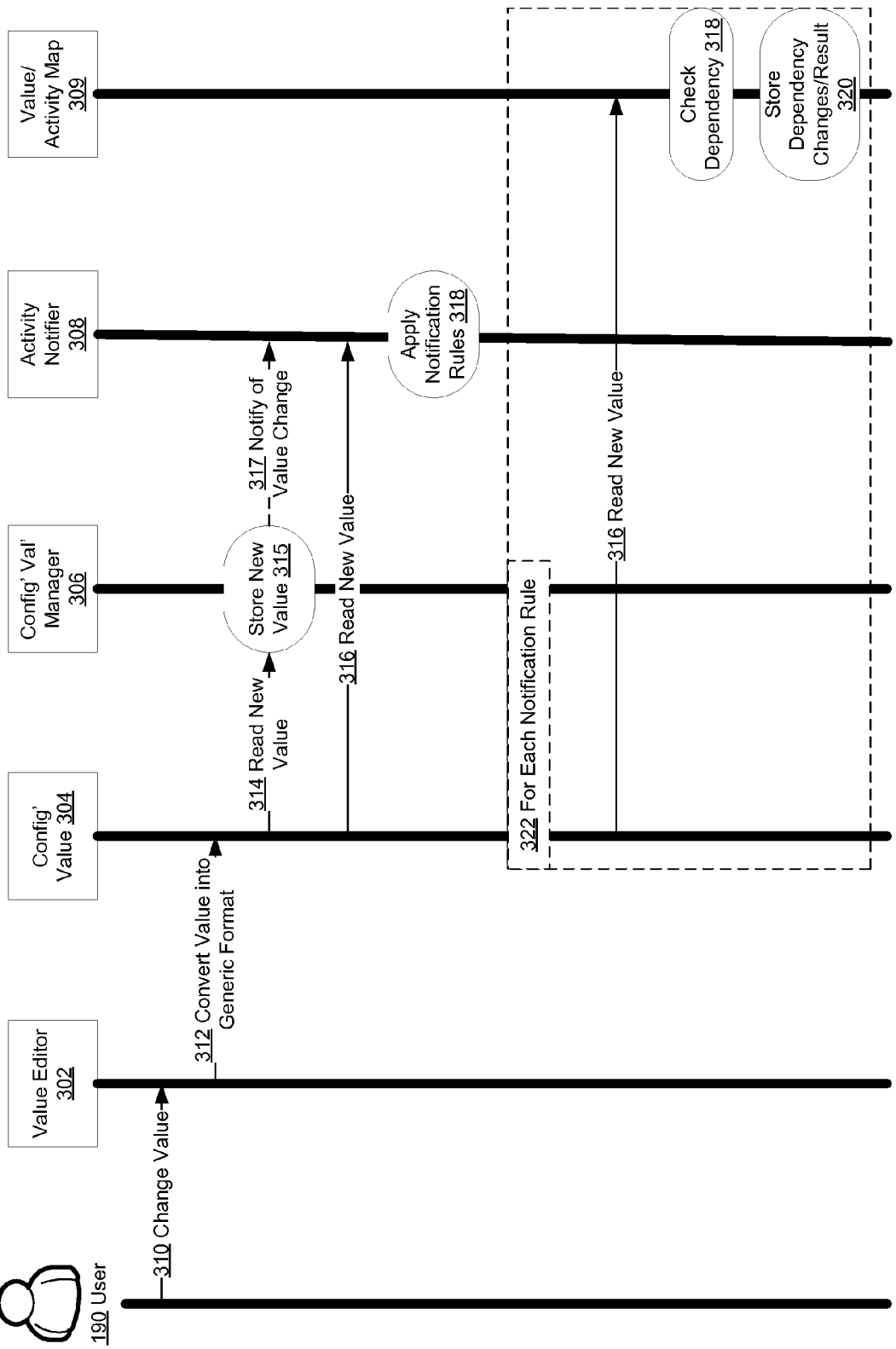
FIG. 3 is a block diagram of an example embodiment of a system in accordance with the disclosed subject matter.

FIG. 3 is a block diagram of an example embodiment of a system 300 in accordance with the disclosed subject matter. FIG. 3 may show the timing relationship of various actions performed in regards to storing or changing a configuration value 304. In one embodiment, the system 300 may include a configuration value editor 302, a configuration value 304, a configuration value manager 306, an activity notifier 308 and a configuration value to activity mapping 309.

In one embodiment, as illustrated by action 310, the user 190, an activity (not shown), or another entity may change or request that a configuration value 304 be changed. In various embodiments, the user 190 may make this request via a UI, as described above. In such an embodiment, this request may be received by a configuration value editor 302.

Action 312 illustrates that, in one embodiment, the configuration value editor 302 may convert the received configuration value data into a generic storage format. While a specific embodiment of the generic storage format is described in more detail in regards to FIG. 5, generally the generic storage format may include a data storage format that is accessible by a plurality of different services or applications. In such an embodiment, the generic format may include a field or encoding that allows the configuration value 304's scope to be determined in a multiple computing device system. In various embodiments, the generic configuration data 112 may be stored in an Extensible Markup Language (XML) format; although, it is understood that the above is merely one illustrative example to which the disclosed subject matter is not limited.

Actions 314 and 315 illustrate that, in one embodiment, the generic formatted data may be stored as the configuration value 304. In various embodiments, the configuration value 304 may be stored in a database, vale storage system, or a file system. In the illustrated embodiment, the configuration value manager 306 may store the configuration value 304. In various embodiments, Action 317 illustrates that, in one embodiment, the configuration value manager 306 may also be configured to notify the activity notifier 308 that a configuration value 304 has changed.

In another embodiment, the activity notifier 308 may be informed of the change by another component or may actively monitor the configuration value 304 itself. In such an embodiment, Action 316 illustrates that, in one embodiment, the action notifier 308 may read the configuration value 304 to determine if the configuration value 304 has changed.

If the configuration value 304 has changed, Action 318 illustrates that, in one embodiment, the activity notifier 308 may be configured apply one or more notification rules. In various embodiments, the testing or filtering based upon the notification rules may be limited by a relevance test that may select or apply only notification rules associated with the changed configuration value 304 or the type of changed configuration value 304 (in embodiments in which configuration values are grouped by or include value typing). Grouping 322 illustrates that, in one embodiment, the actions 316, 318, and 320 may be performed for each notification rule.

Action 316 illustrates that, in one embodiment, the value of the configuration value 304 may again be read. Action 318 illustrates that, in one embodiment, the configuration value 304 may be compared to the association table or scheme stored within or included by the configuration value to activity mapping 309. In addition, the once an association between the changed configuration value 304 and an activity have been found, the notification rules may be applied to configuration value 304 and the activity (e.g., testing scope, etc.). If the activity and configuration value 304 both met the criteria dictated by the notification rule, the activity may be deemed or determined to be dependent upon the changed configuration value 304, and the Action 316 of checking the dependency may be completed.

Action 320 illustrates that, in one embodiment, once a result regarding the dependency status between the configuration value 304 and the activity has been determined, the result may be stored within the dependent activity list, as described above. In various embodiments, the dependent activity list may include a list of all activities and a value indicating whether or not the activity is dependent upon the change configuration value 304. In another embodiment, the dependent activity list may simply include a list of all activities that are dependent upon the changed configuration value 304. It is understood that the above are merely a few illustrative examples to which the disclosed subject matter is not limited.

Figure 4:
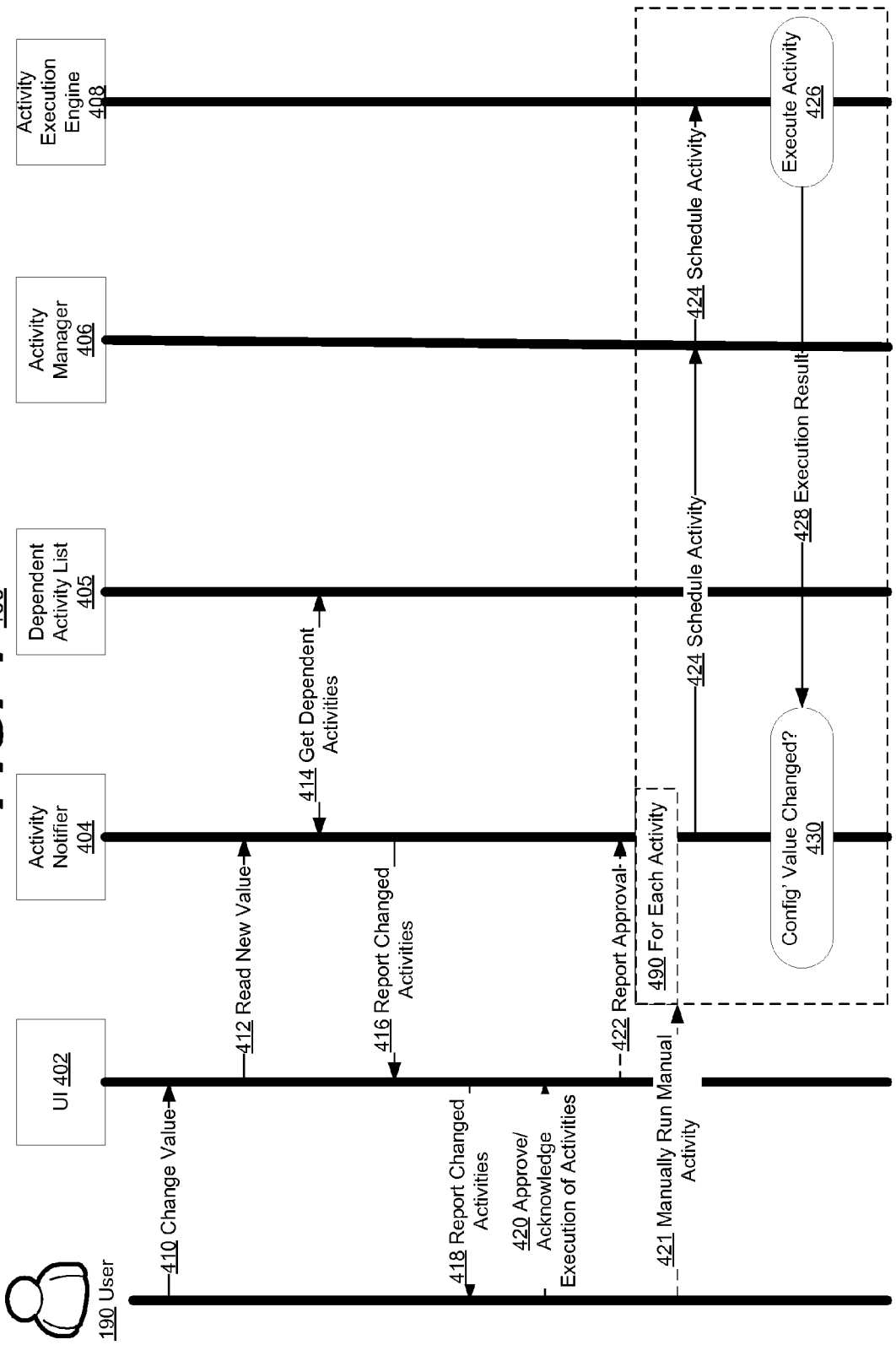
FIG. 4 is a block diagram of an example embodiment of a system in accordance with the disclosed subject matter.

FIG. 4 is a block diagram of an example embodiment of a system 400 in accordance with the disclosed subject matter. FIG. 3 may show the timing relationship of various actions performed in regards to notifying activities about changes in a configuration value. In one embodiment, the system 400 may include a configuration user interface 402, an activity notifier 404, a dependent activity list 405, an activity manager 406 and one or more activity execution engines 408.

In one embodiment, Actions 410, 412, and 414 may represent an abbreviated version of the Actions illustrated by FIG. 3. In another embodiment, the Actions 410, 412, and 414 may represent a different embodiment of the disclosed subject matter than that illustrated by FIG. 3. It is understood that the above are merely two illustrative examples to which the disclosed subject matter is not limited.

Action 410 illustrates that, in one embodiment, a user 190, activity or other entity may change the data stored within a configuration value. In the illustrated embodiment, the user 190 may employ a UI 402 to carry out this change. Action 412 illustrates that, in one embodiment, the activity notifier 404 may read this changed configuration value. Action 414 illustrates that, in one embodiment, the activity notifier 404 may generate the dependent activity list 406 based upon the changed configuration value. As described above, this dependent activity list 406 may also be filtered or generated based upon one or more notification rules.

Action 416 illustrates that, in one embodiment, the activity notifier 404 may report, to the UI 402, either directly or indirectly (e.g., via an activity manager 406, etc.) that one or more activities are dependent upon the changed configuration value. Action 418 illustrates that, in one embodiment, the UI 402 may report or indicate to the user 190 which activities are dependent upon the changed configuration value.

As described above, in various embodiments, the reporting or indication of the dependent activities may take a number of forms. For example, in one embodiment, a pop-up or dialog box may be shown to a user 190 indicating the activities which are dependent upon the changed configuration value. In some embodiments, this dialog box may allow a user to cancel or approve the automatic execution of at least a portion of these activities. In another embodiment, the pop-up or dialog box may only inform the user 190 that the displayed activities are being automatically executed due to the changed configuration value. In yet another embodiment, the manual activities may not be automatically executed, but the user 190 may be informed of which activities need to be manually re-executed. In various embodiments, the forms of notification or indication may differ based upon the activity type (e.g., automatic, manual, etc.), or user preferences, etc. It is understood that the above are merely a few illustrative examples to which the disclosed subject matter is not limited.

Action 420 illustrates that, in various embodiments, the user 190 may acknowledge that the reported automatic activities are to be executed. In another embodiment, the Action 420 may represent that the user 190 has approved all or a portion of the activities for execution by the activity execution engine 408. Action 422 illustrates that, in one embodiment, such an approval may be transmitted to the activity notifier 404.

Grouping 490 illustrates that, in one embodiment, Actions 424, 426, 428, and 430 may be performed for each activity which is to be executed. As described above, in various embodiments, each activity may have been approved by the user 190 (e.g., via Action 420). However, in a more preferred embodiment, automatic activities or a first type or class of activities may be automatically executed without manual user 190 intervention. In such an embodiment, manual activities or a second type or class of activities may not experience Grouping 490 until the user 190 manually causes the activities to be executed (e.g., via Action 421). It is understood that the above are merely a few illustrative examples to which the disclosed subject matter is not limited.

Action 424 illustrates that, in one embodiment, the dependent activity may be scheduled to be executed. In some embodiments, this may include the activity notifier 404 requesting the execution of the activity from the activity manager 406. The activity manager 406 may subsequently schedule or submit the dependent activity for execution with the activity execution engine 408. As described above, the activity notifier 404 and the activity manager 406 may be executed or included by different computing devices or systems.

Action 426 illustrates that, in one embodiment, the dependent activity may be executed by the activity execution engine 408. Action 428 illustrates that, in one embodiment, the results of that executed activity may be generated. In one embodiment, the results may include the changing of one or more configuration values.

Action 430 illustrates that, in one embodiment, a check or determination may be made as to whether or not the executed activity causes one or more configuration values to be changed. In some embodiments, this check may occur as part of a regularly scheduled checking event (e.g. an event controlled by a timer, etc.). In another embodiment, the Action 430 may occur based upon the completion of the executed activity.

In some embodiments, if a change in a configuration value is detected in Action 430, the illustrated technique of using system 400 may be repeated based upon the newly change configuration value or values. In various embodiments, the illustrated Actions of FIG. 4 may be repeated starting with Actions 412 or 414 but this iteration the Actions may be performed based upon the newly changed configuration value. In such an embodiment, any activities found (in the second or subsequent iterations of Action 414) to be directly dependent upon the newly changed configuration value (from Action 438) may be said to be indirectly dependent upon the original changed configuration value (from Action 410).

In such an embodiment, an original change in a configuration value may propagate through a number of activities which are directly or indirectly dependent upon the configuration value. Further, in such an embodiment, a manually executed activity may cause the automatic execution of automatic activities which are dependent upon the results of the manual activity, and vice versa. In various embodiments, the direct and indirectly dependent activities may be very complex and far reaching. In such an embodiment, the effects of the change in the original configuration value may be limited or filtered by one or more notification rules.

In some embodiments, the detection of indirectly dependent activities may be determined in Action 414. In such an embodiment, the recursive nature or multiple iterations of the Actions illustrated by FIG. 4 may not occur. In such an embodiment, a more complex scheduling system may be employed to assure that the predecessor, observed, or directly dependent activities occur and finish execution prior to subsequent, observer, or indirectly dependent activities. In various embodiments, there may be levels or orders of dependency (e.g., a directly dependent activity, a first-order indirectly dependent activity which depends on the results of the directly dependent activity, and a second-order indirectly dependent activity which depends on the results of the first-order indirectly dependent activity). In such an embodiment, the activity scheduling may be very complex, especially if the various activities take various times to execute.

Figure 5:
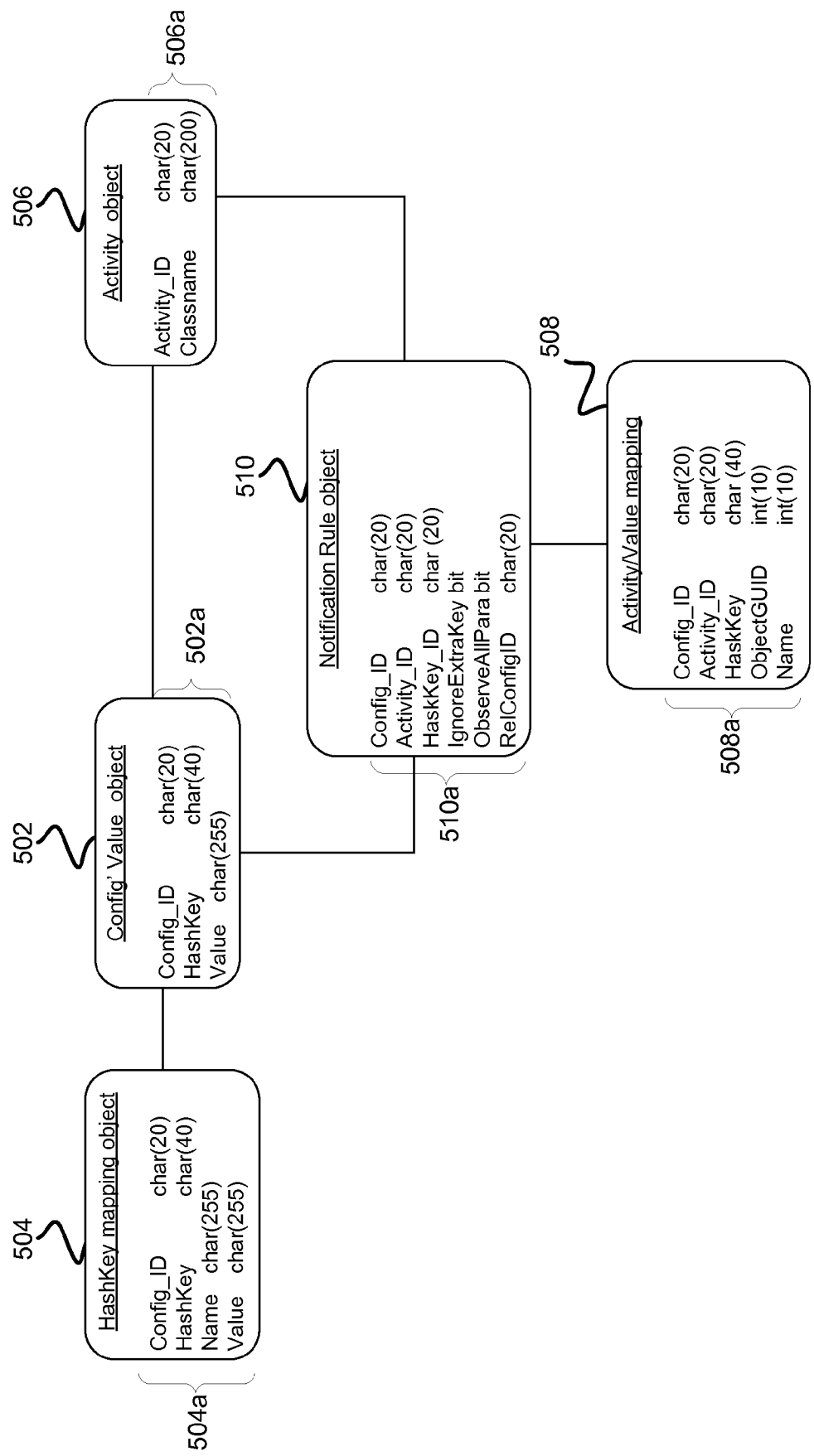
FIG. 5 is a block diagram of an example embodiment of a system in accordance with the disclosed subject matter.

FIG. 5 is a block diagram of an example embodiment of a system 500 in accordance with the disclosed subject matter. In various embodiments, the elements of system 500 may include portions of an embodiment of the components of the systems of FIGS. 1 and 2. In one embodiment, the system 500 may include a plurality of objects or classes. In this context, an "object" may include a data structure having a combination of attributes (object elements or members) and/or behaviors (functions, methods, or subroutines). In this context, a "class" may include a definition of an object which may be instantiated (as an object) during the execution of a set of machine executable instructions.

In one embodiment, the system 500 may include a configuration value object 502. The configuration value object 502 may be configured to represent the configuration value in a data structure substantially equivalent to the generic storage format. In one embodiment, the configuration value object 502 may include a number of members or values 502*a*. In one embodiment, one configuration value object 502 member may be a "Config_ID" which is configured to store a string of set of characters or a key which may be referred to by an activity. In some embodiments, the "Config_ID" may be thought of as the configuration value's name. In one embodiment, one configuration value object 502 member may be a "HashKey" which identifies the configuration value in a substantially unique manner within system 500. For example, in some embodiments, multiple configuration values may include the same Config_ID (e.g., as names or Config_IDs may be re-used across computing devices in heterogeneous environment, etc.), but each configuration value may have a substantially unique HashKey. In one embodiment, one configuration value object 502 member may be a "value" which is configured to store the value or data of the configuration value. In various embodiments, other members may be included by the configuration value object 502 (e.g., "CreatedBy, ChangedBy, etc.)

In one embodiment, the system 500 may include a HashKey mapping object 504. The HashKey mapping object 504 may be configured to link or map the computed HashKey with the corresponding logical key values. In one embodiment, the HashKey mapping object 504 may include a number of members or values 504*a*.

In one embodiment, of the generic storage format, multiple fields and values (referred to as a "logical key") may be converted into a substantially unique HashKey that, in combination with the Config_ID may substantially identify the configuration value. Also, in one embodiment, the conversion from the multiple fields and values to the HashKey may be mathematically irreversible; hence a mapping of the HashKey to the fields and values of the logical key may be desirable.

For example, a logical key may include three fields/value pairs: SystemID=SMF, Client=200, and SystemType=ABAP. These field/value pairs may be concatenated into a single string "Client=200; SystemID=SMF; SystemType=ABAP". This concatenated string may be converted into a HashKey, such as:

97CC2091071BFCF9DEABC29D5119028B33FEA993

The members 504*a* of the HashKey mapping object 504 may store the ConfigID, HashKey, and one or more of the field/value pairs of the logical key from which the HashKey was derived. A number of the HashKey mapping object 504 may be thought of as a table listing the ConfigID, HashKey, and the field/value pairs of the logical key. This table may be consulted to determine field/value pairs of interest in regards to the various configuration values reference therein.

In various embodiments, the logical key or the field/value pairs thereof may be configured to define the scope of the associated configuration values. As can be seen above, the logical key may define the service or system type to which the configuration value applies. Likewise, with the user computing system or other scope related definitions. In various embodiments, a configuration value's logical key may be empty (e.g., a configuration value with global scope). It is understood that the above is merely one illustrative example to which the disclosed subject matter is not limited.

In various embodiments, the generic storage format may include the HashKey as a way to greatly simplify the varying complexity levels of data (i.e. logical keys) from the heterogeneous services to a unified simple key/value pair (i.e. the HashKey). As a result the processing time of the simplified generic storage format may be greatly reduced.

For example, in the case of a XML storage format the XML tree is greatly flattened resulting in faster access and storage. If the logical key was stored directly in the XML, the XML tree would vary from system to system and configuration value to configuration value in terms of depth and complexity. However with a HashKey, each configuration value is stored in a uniform level of XML complexity, which is easier to process. It is understood that the above is merely one illustrative example to which the disclosed subject matter is not limited.

In one embodiment, the system 500 may include an activity object 506. The activity object 506 may be configured to store or represent an activity. In one embodiment, the activity object 506 may include a number of members or values 506a. The members 506a may include an Activity_ID and a class name or activity type, as described below in reference to FIG. 6.

In one embodiment, the system 500 may include an activity/value mapping object 508. The activity/value mapping object 508 may be configured to store an association between a configuration value and an activity. In one embodiment, the activity/value mapping object 508 may include a number of members or values 508a. The members 508a may include an Activity_ID representing the observing activity's identifier, and the Config_ID and HashKey of the configuration value associated with the activity. In one embodiment, a plurality of activity/value mapping objects 508 may be viewed or displayed as a table mapping the observed configuration values to their associated dependent or observer activities.

In one embodiment, the system 500 may include a notification rule object 510. The notification rule object 510 may be configured to store one or more notification rules, as described above. In one embodiment, the notification rule object 510 may include a number of members or values 510a. The members 510a may include an Activity_ID representing the observing activity's identifier, and values or fields indicating which parameters and under which conditions the notification rule applies to the activity and configuration value.

Figure 6:
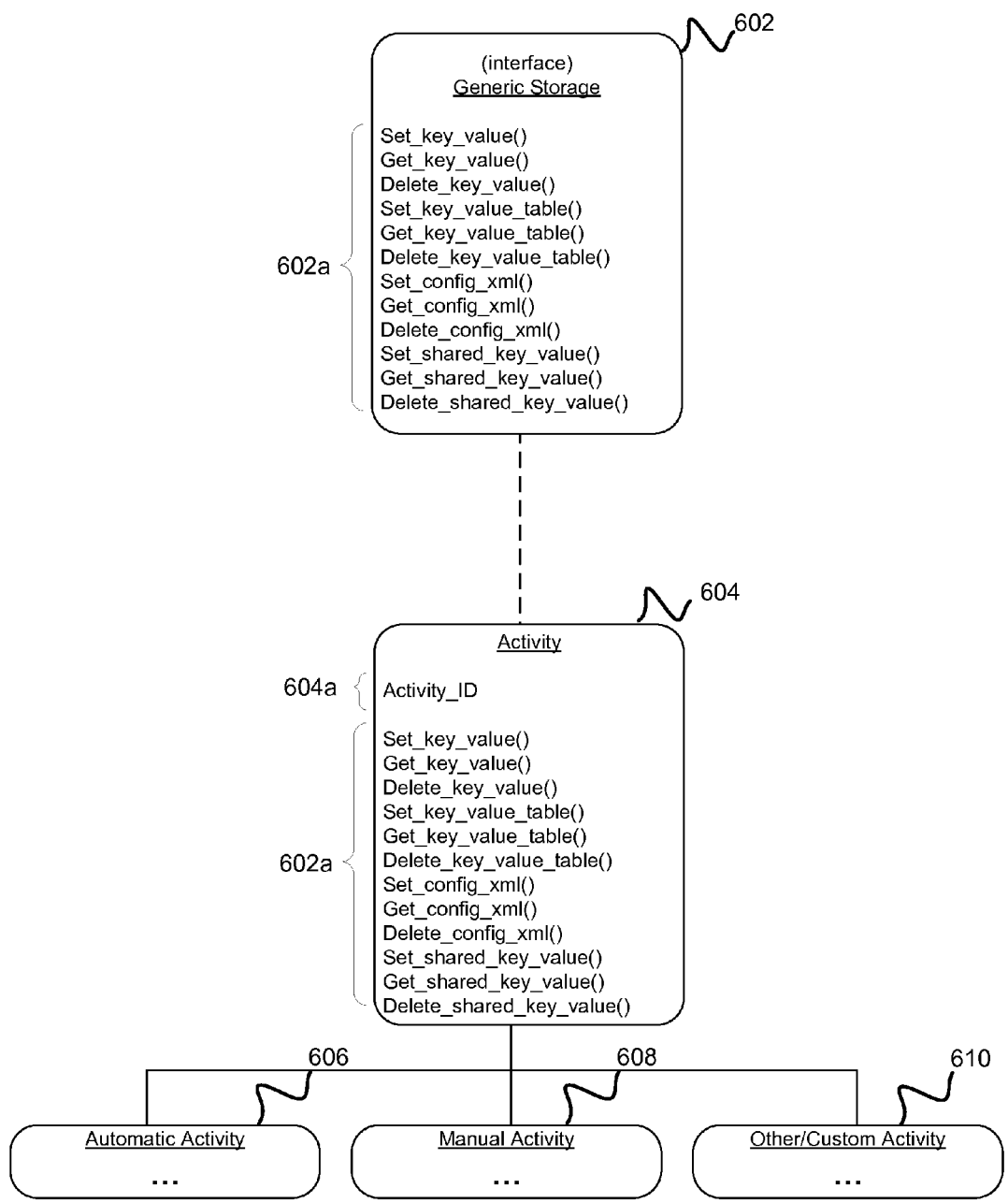
FIG. 6 is a block diagram of an example embodiment of a system in accordance with the disclosed subject matter.

FIG. 6 is a block diagram of an example embodiment of a system 600 in accordance with the disclosed subject matter. In various embodiments, the elements of system 600 may include portions of an embodiment of the components of the systems of FIGS. 1 and 2. In one embodiment, the system 600 may include a plurality of objects, abstract classes, or interfaces. In this context, an "abstract class" includes a definition of a class which may not be directly instantiated (created as an object), but instead defines members and/or methods that an inheriting class may acquire via object-oriented programming principles. In this context, an "interface" is a variation of an abstract class that allows for an inheriting class to inherent from a plurality of parent classes, which may not normally be allowed depending upon the programming language.

In the illustrated embodiment, the abstract class or interface 602 may define a plurality of methods 602a for reading and writing data using the generic storage format. In such an embodiment, any class or object that inherits from the abstract class or interface 602, gains access to the generic storage formatting scheme without having to define such methods manually. In the illustrated embodiment, methods 602a for getting (reading), setting (writing), and deleting a configuration value or values associated with a key are defined. The methods 602a may support automatically updating the objects or classes illustrated by FIG. 5 as configuration values and keys are altered.

In such an embodiment, the activity class or object 604 may define an activity, as described above. In various embodiments, the activity class or object 604 may inherent the methods 602a from the abstract class or interface 602. As such, each activity (e.g., objects based upon classes 604, 606, 608 or 610) may make use of the generic storage scheme defined by the methods 602a.

In various embodiments, the activity class or object 604 may further include members and/or methods not inherited from the abstract class 602. Such members/methods 604a may include an activity identifier. It is understood that the above is merely one illustrative example to which the disclosed subject matter is not limited.

Further, in one embodiment, the system 600 may include a plurality of class for various activity types that inherent methods/members from the activity class 604. Such child activity classes may include: an automatic activity 606, a manual activity 608, and a custom activity 610. It is understood that the above are merely a few illustrative examples to which the disclosed subject matter is not limited.

FIG. 7 is a flow chart of an example embodiment of a technique in accordance with the disclosed subject matter. In various embodiments, the technique 700 may be used or produced by the systems such as those of FIG. 1, 2, 3, or 4. Furthermore, portions of technique 700 may be produced or result in the objects or classes such as that of FIG. 5 or 6. Although, it is understood that the above are merely a few illustrative examples to which the disclosed subject matter is not limited. It is understood that the disclosed subject matter is not limited to the ordering of or number of actions illustrated by technique 700.

Block 702 illustrates that, in one embodiment, 702 a configuration value may be associated with one or more machine executable activities, as described above. In various embodiments, one or more of the action(s) illustrated by this Block may be performed by the apparatuses or systems of FIG. 1, 2, 3, 4, or 8, the value/activity map 122 of FIGS. 1 and 2, as described above.

Block 703 illustrates that, in one embodiment, a configuration value may be stored in a generic format, as described above. In such an embodiment, the generic format may include a generic format that is accessible by a plurality of a plurality of different types of application programs each respectively being executed by one of a plurality of systems, as described above. In various embodiments, the generic format may include a hashkey that is generated from a combination of a plurality of names and associated values, as described above. In various embodiments, one or more of the action(s) illustrated by this Block may be performed by the apparatuses or systems of FIG. 1, 2, 3, 4, or 8, the configuration value manager 110 of FIGS. 1 and 2, as described above.

Block 704 illustrates that, in one embodiment, a change in the configuration value may be detected, as described above. In various embodiments, one or more of the action(s) illustrated by this Block may be performed by the apparatuses or systems of FIG. 1, 2, 3, 4, or 8, the configuration value manager 110 or activity notifier 120 of FIGS. 1 and 2, as described above.

Block 706 illustrates that, in one embodiment, a determination may automatically be made as to which, if any, machine executable activities are directly dependent upon the changed configuration value, as described above. In various embodiments, determining may include accessing a table linking observed configuration values and respective observing machine executable activities, as described above. In some embodiments, determining may include filtering the machine executable activities that are directly dependent upon the changed configuration value based upon one or more notification rules, as described above. In such an embodiment, the notification rules may specify that a machine executable activity is only to be executed if the execution occurs on a specific machine, as described above. In such an embodiment, filtering may include examining a hashkey associated with configuration value, and wherein the hashkey defines the scope in which configuration value applies, as described above. In various embodiments, one or more of the action(s) illustrated by this Block may be performed by the apparatuses or systems of FIG. 1, 2, 3, 4, or 8, the activity notifier 120 of FIGS. 1 and 2, as described above.

Block 708 illustrates that, in one embodiment, a user may be notified that that at least one or more of the detected directly dependent machine executable activities are to be executed by a processor, as described above. In various embodiments, one or more of the action(s) illustrated by this Block may be performed by the apparatuses or systems of FIG. 1, 2, 3, 4, or 8, the activity manager 130 or user interface 150 of FIGS. 1 and 2, as described above.

Block 710 illustrates that, in one embodiment, at least a portion of the machine executable activities that are directly dependent upon the changed configuration value may be automatically executed by a processor, as described above. In various embodiments, executing the activities may include executing each of the machine executable activities on a respective one of a plurality of computing systems, wherein the plurality of computing systems are in communication with each other via a communications network, as described above. In some embodiments, the activities may include a first portion of machine executable activities that includes automatic machine executable activities, and a second portion of the machine executable activities which includes non-automatic machine executable activities, as described above. In such an embodiment, executing may include automatically executing the first portion of machine executable activities, and indicating to a user that the second portion of the machine executable activities should be executed with the changed configuration value, as described above. In various embodiments, one or more of the action(s) illustrated by this Block may be performed by the apparatuses or systems of FIG. 1, 2, 3, 4, or 8, the activity execution engine 140 or user interface 150 of FIGS. 1 and 2, as described above.

Block 712 illustrates that, in one embodiment, a determination may made regarding whether or not the executed machine executable activities resulted in a change of at least a second configuration value, as described above. If so, in one embodiment, the technique 700 may be repeated, at least in part, using the newly changed configuration value, as described above. In various embodiments, one or more of the action(s) illustrated by this Block may be performed by the apparatuses or systems of FIG. 1, 2, 3, 4, or 8, the activity notifier 120 of FIGS. 1 and 2, as described above.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method comprising:
   associating at least one configuration value with at least one machine executable activity;
   detecting that the at least one configuration value has changed;
   automatically determining which, if any, machine executable activities are dependent upon the changed at least one configuration value;
   automatically executing, by a processor, at least a portion of the machine executable activities that are dependent upon the changed at least one configuration value;
   determining if the executed machine executable activities result in a change of at least one other configuration value;
   determining which, if any, machine executable activities are dependent upon the changed at least one other configuration value; and
   automatically executing, by a processor, at least a portion of the machine executable activities that are dependent upon the changed at least one other configuration value.

2. The method of claim 1, wherein the machine executable activities include:
   a first portion of machine executable activities that includes automatic machine executable activities, and
   a second portion of the machine executable activities which includes non-automatic machine executable activities; and
   wherein automatically executing at least a portion of the machine executable activities includes:
   automatically executing the first portion of machine executable activities, and
   indicating to a user that the second portion of the machine executable activities should be executed with the changed configuration value.

3. The method of claim 1, wherein determining which, if any, machine executable activities are dependent upon the changed configuration value includes:
   accessing a table linking observed configuration values and respective observing machine executable activities.

4. The method of claim 1, further comprising storing the configuration value in a generic format that is accessible by a plurality of a plurality of different types of application programs each respectively being executed by one of a plurality of systems, and
   wherein the generic format comprises a hashkey that is generated from a combination of a plurality of names and associated values.

5. The method of claim 1, wherein automatically executing, by a processor, at least a portion of the machine executable activities comprises:
   executing each of the machine executable activities on a respective one of a plurality of computing systems, wherein the plurality of computing systems are in communication with each other via a communications network.

6. A method comprising:
   associating a configuration value with at least one machine executable activity;
   detecting that the configuration value has changed;
   automatically determining which, if any, machine executable activities are directly dependent upon the changed configuration value;
   automatically executing, by a processor, at least a portion of the machine executable activities that are directly dependent upon the changed configuration value;
   determining if the executed machine executable activities result in a change of at least a second configuration value;
   determining which, if any, machine executable activities are directly dependent upon the changed at least a second configuration value; and
   automatically executing, by a processor, at least a portion of the machine executable activities that are directly dependent upon the changed at least a second configuration value.

7. The method of claim 1, wherein determining which, if any, machine executable activities are dependent upon the changed configuration value comprises:
   filtering the machine executable activities that are dependent upon the changed configuration value based upon at least one notification rule.

8. The method of claim 7, wherein the notification rules specify that a machine executable activity is only to be executed if the execution occurs on a specific machine.

9. The method of claim 7, wherein filtering the machine executable activities that are dependent upon the changed configuration value based upon at least one notification rule includes:
   examining a hashkey associated with configuration value, and wherein the hashkey defines the scope in which configuration value applies.

10. An apparatus comprising:
    a memory configured to store at least one configuration value in a generic format;
    a processor configured to execute at least one machine executable activity; and
    a notification system configured to:
    associate at least one configuration value with at least one machine executable activity;
    detect that the at least one configuration value has changed;
    automatically determine which, if any, machine executable activities are dependent upon the changed at least one configuration value;
    automatically cause the execution, by the processor, of at least a portion of the machine executable activities that are dependent upon the changed at least one configuration value;
    determine if the executed machine executable activities result in a change of at least one other configuration value;
    determine which, if any, machine executable activities are dependent upon the changed at least one other configuration value; and
    automatically causing the execution, by a processor, at least a portion of the machine executable activities that are dependent upon the changed at least one other configuration value.

11. The apparatus of claim 10, wherein the machine executable activities include:
    a first portion of machine executable activities that includes automatic machine executable activities, and
    a second portion of the machine executable activities which includes non-automatic machine executable activities; and
    wherein the notification system is configured to:
    automatically cause the execution of the first portion of machine executable activities, and
    indicate to a user that the second portion of the machine executable activities should be executed with the changed configuration value.

12. The apparatus of claim 10, wherein the notification system is configured to:
    access a table mapping observed configuration values and respective observing machine executable activities.

13. The apparatus of claim 10, the memory is configured to store the configuration value in a generic format that is accessible by a plurality of a plurality of different types of application programs each respectively being executed by one of a plurality of systems, and
    wherein the generic format comprises a hashkey that is generated from a combination of a plurality of names and associated values.

14. The apparatus of claim 10, wherein the notification system is configured to:
    filter the machine executable activities that are dependent upon the changed configuration value based upon at least one notification rule.

15. The apparatus of claim 14, wherein the notification rules specify that a machine executable activity is only to be executed if the execution occurs on a specific machine.

16. The apparatus of claim 10, wherein the notification system is configured to:
    filter the machine executable activities that are dependent upon the changed configuration value based upon at least one notification rule by, at least in part, examining a hashkey associated with configuration value, and wherein the hashkey defines the scope in which configuration value applies.

17. The apparatus of claim 10, wherein the notification system is configured to:
    cause the execution each of the machine executable activities on a respective one of a plurality of computing systems, wherein the plurality of computing systems are in communication with the apparatus via a communications network.

18. An apparatus comprising:
    a memory configured to store at least one configuration value in a generic format;
    a processor configured to execute at least one machine executable activity; and
    a notification system configured to:
        associate a configuration value with at least one machine executable activity;
        detect that the configuration value has changed;
        automatically determine which, if any, machine executable activities are directly dependent upon the changed configuration value;
        automatically cause the execution, by the processor, of at least a portion of the machine executable activities that are directly dependent upon the changed configuration value;
        determine if the executed machine executable activities result in a change of at least a second configuration value;
        determine which, if any, machine executable activities are directly dependent upon the changed at least a second configuration value; and
        automatically causing the execution, by a processor, at least a portion of the machine executable activities that are directly dependent upon the changed at least a second configuration value.

19. A computer program product for storing and processing information, the computer program product being tangibly embodied on a non-transitory computer-readable medium and including executable code that, when executed, is configured to cause a data processing apparatus to:
    associate at least one configuration value with at least one machine executable activity;
    detect that the at least one configuration value has changed;
    automatically determine which, if any, machine executable activities are dependent upon the changed at least one configuration value;
    automatically execute, by a processor, at least a portion of the machine executable activities that are dependent upon the changed at least one configuration value;
    determine if the executed machine executable activities result in a change of at least one other configuration value;
    determine which, if any, machine executable activities are dependent upon the changed at least one other configuration value; and
    automatically causing the execution, by a processor, at least a portion of the machine executable activities that are dependent upon the changed at least one other configuration value.

20. The computer program product of claim 19, wherein the machine executable activities include:
    a first portion of machine executable activities that includes automatic machine executable activities, and
    a second portion of the machine executable activities which includes non-automatic machine executable activities; and
    wherein executable code that, when executed, is configured to cause a data processing apparatus to:
    automatically execute the first portion of machine executable activities, and
    indicate to a user that the second portion of the machine executable activities should be executed with the changed configuration value.

* * * * *